(12) United States Patent
Fan (10) Patent No.: US 10,313,642 B2
(45) Date of Patent: Jun. 4, 2019

(54) IMAGING SYSTEM HAVING DUAL IMAGE SENSORS

(71) Applicant: OmniVision Technologies, Inc., Santa Clara, CA (US)

(72) Inventor: Chun-Sheng Fan, Hsinchu (TW)

(73) Assignee: OmniVision Technologies, Inc., Santa Clara, CA (US)

(*) Notice: Subject to any disclaimer, the term of this patent is extended or adjusted under 35 U.S.C. 154(b) by 28 days.

(21) Appl. No.: 15/408,724

(22) Filed: Jan. 18, 2017

(65) Prior Publication Data

US 2018/0205916 A1 Jul. 19, 2018

(51) Int. Cl.
| | |
|---|---|
| *H04N 9/07* | (2006.01) |
| *H04N 3/14* | (2006.01) |
| *H04N 5/335* | (2011.01) |
| *H04N 9/097* | (2006.01) |
| *H04N 5/225* | (2006.01) |
| *G02B 27/10* | (2006.01) |
| *G02B 13/00* | (2006.01) |
| *H04M 1/02* | (2006.01) |

(52) U.S. Cl.
CPC ......... *H04N 9/097* (2013.01); *G02B 13/0065* (2013.01); *G02B 13/0085* (2013.01); *G02B 27/1013* (2013.01); *H04M 1/0264* (2013.01); *H04N 5/2258* (2013.01)

(58) Field of Classification Search
CPC ........ H04N 5/2258; H04N 9/76; H04N 9/097; H04N 9/07; H04M 1/0202; H04M 1/0264; G02B 13/0065; G02B 13/0085; G02B 27/1013

USPC ......... 348/222.1, 224.1, 272, 273, 335, 337, 348/340

See application file for complete search history.

(56) References Cited

U.S. PATENT DOCUMENTS

| | | | | |
|---|---|---|---|---|
| 6,690,268 | B2* | 2/2004 | Schofield | B60C 23/00 340/438 |
| 7,057,654 | B2* | 6/2006 | Roddy | H04N 9/045 348/277 |
| 8,711,256 | B2* | 4/2014 | Yoshikawa | H04N 5/2258 348/234 |
| 8,988,564 | B2* | 3/2015 | Webster | G02B 27/1013 348/265 |
| 9,094,567 | B2* | 7/2015 | Olson | H04N 5/332 |
| 9,223,118 | B2 | 12/2015 | Mercado | |
| 9,316,810 | B2 | 4/2016 | Mercado | |
| 2011/0074931 | A1* | 3/2011 | Bilbrey | H04N 5/2258 348/48 |

(Continued)

FOREIGN PATENT DOCUMENTS

JP 09074571 A * 3/1997 ............ H04N 9/09

*Primary Examiner* — Ngoc Yen T Vu (57) ABSTRACT

An imaging system for capturing an image of an object comprises a first lens, a dichroic beam splitter, which transmits light of a color band and reflects light of all colors outside the color band, a first image sensor for capturing an image formed by the transmitted light in the color band, a second image sensor for capturing an image formed by the reflected light outside the color band. The first image sensor is a monochrome image sensor and the second image sensor is a color image sensor having a color filter array disposed on pixels of the second image sensor. The image captured by the first image sensor and the image captured by the second image sensor are combined to form a single color image.

13 Claims, 10 Drawing Sheets

(56) References Cited

U.S. PATENT DOCUMENTS

2016/0216524 A1    7/2016    Deng et al.
2017/0160523 A1*  6/2017    Wolterink .......... G02B 13/0065
2017/0318273 A1*  11/2017  Mantzel ................ H04N 13/25

* cited by examiner

IMAGING SYSTEM HAVING DUAL IMAGE SENSORS

FIELD OF THE INVENTION

This invention relates to an imaging system, and more specifically relates to an imaging system having dual image sensors.

BACKGROUND OF THE INVENTION

Mobile phones and other electronic devices are having decreasing thicknesses. If the mobile phone is equipped with an optical imaging system, the length of the optical imaging system may need to shorten so it can be installed in the mobile phone. The optical imaging system must be fit inside the mobile phone. In some instances, the optical path of the optical imaging system is folded inside the mobile phone, thus the total length of the optical path is not necessarily shortened.

A single image sensor may be used to capture the image. To improve the pixels resolution, i.e., to increase the number of pixels in the same area, three image sensors with an X-cube or a cross dichroic beam splitter may be used. However, an X-cube is made by combining four triangular prisms. Multiple X-cubes cannot be manufactured as a two-dimensional planar wafer. This will affect the cost of the end product since an X-cube cannot be used in wafer level manufacturing process. Wafer level manufacturing process conducts all processes in wafer forms before singulating units of imaging system. Also, the smallest size of the manufactured X-cube may be limited by the method for combining its prisms.

Accordingly, optical imaging systems that can fit inside the mobile phone, has better resolution than single image sensors, and can be manufactured in wafer level process are demanded. The imaging systems may be used for other electronic devices, which have decreasing thicknesses.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable combinations and/or sub-combinations in one or more embodiments.

Figure 1:
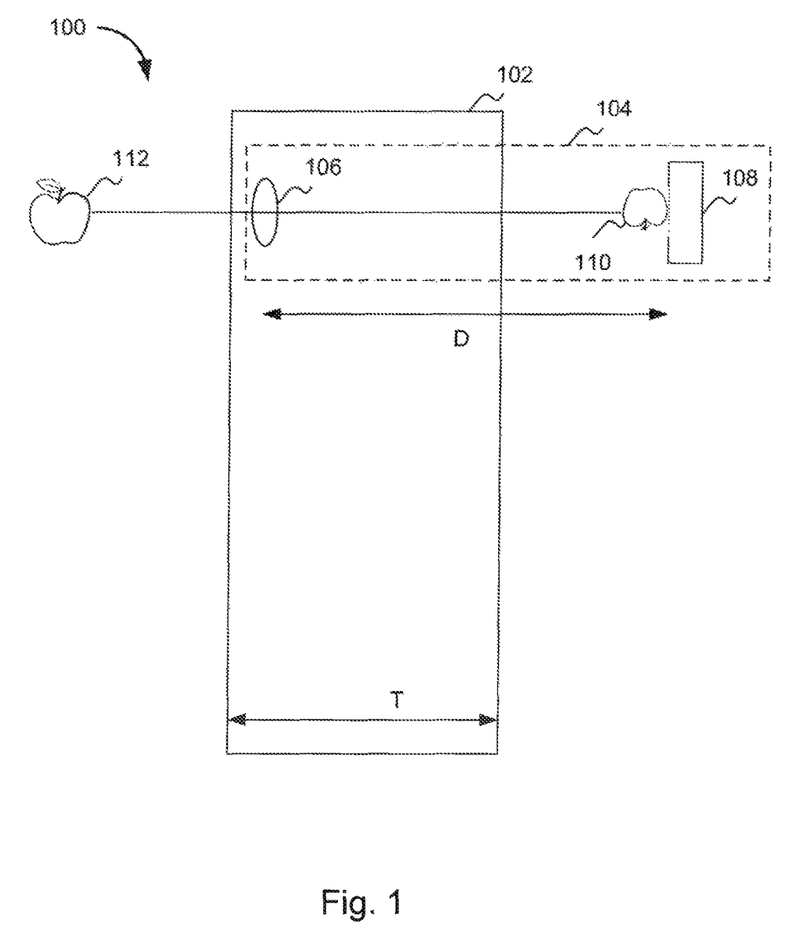
FIG. 1 illustrates an exemplary embodiment comprising an optical imaging system and a mobile phone.

FIG. 1 illustrates an exemplary embodiment 100 comprising an optical imaging system 104 and a mobile phone 102. Optical imaging system 104 comprises an imaging lens 106 and an image sensor 108. Image sensor 108 may be a color or monochrome image sensor. Imaging lens 106 forms an image 110 of a subject and/or object 112 on image sensor 108. For simplicity, subject and/or object 112 is described as object 112 in the disclosure. It is appreciated that object 112 may be a subject or any object. Imaging system 102 cannot be installed in a portable device such as mobile phone 102, because the distance D between imaging lens 106 and image sensor 108, or the length of optical imaging system 104, may be larger than the thickness T of mobile phone 102. For simplicity, a portable device is described as mobile phone 102 in the disclosure. It is appreciated that mobile phone 102 may represent any portable devices having small sizes and/or decreasing thicknesses.

Figure 2:
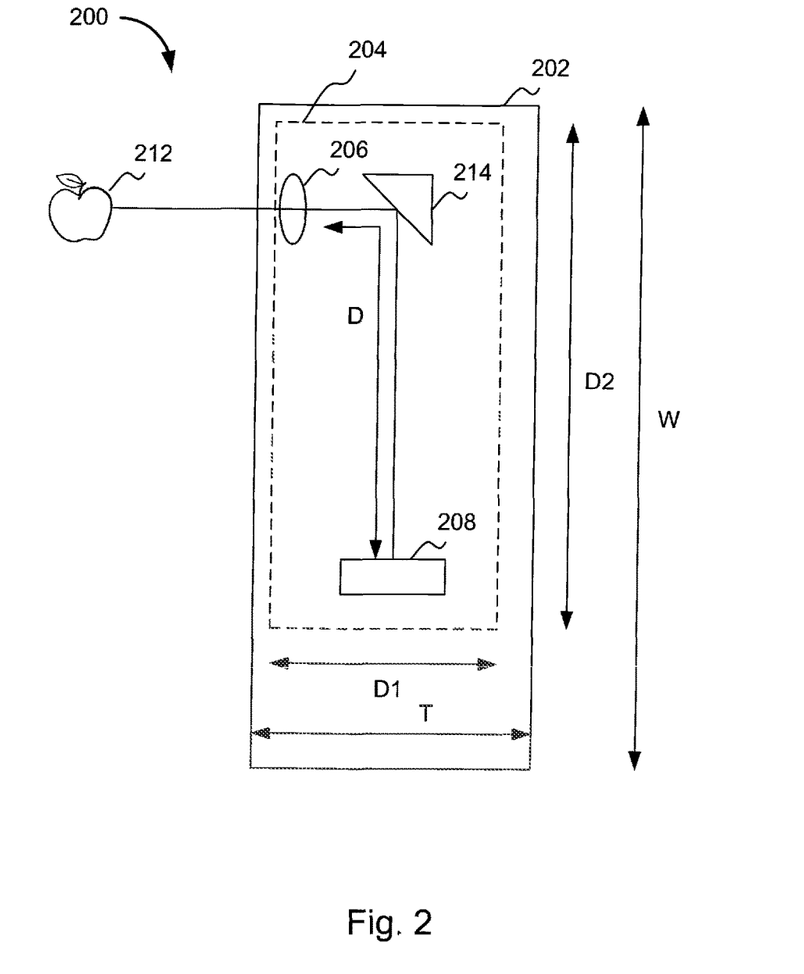
FIG. 2 illustrates an exemplary embodiment comprising an optical imaging system installed in a mobile phone.

FIG. 2 illustrates an exemplary embodiment 200 comprising an optical imaging system 204 installed in a mobile phone 202. Imaging system 204 comprises an imaging lens 206, an image sensor 208, and a reflector 214. Imaging lens 206 forms an image of an object 212 on image sensor 208. For simplicity, the image of object 212 is not shown in FIG. 2 (also FIGS. 3 and 4). Image sensor 208 may be a color or monochrome image sensor. Light transmitted through imaging lens 206 is reflected by reflector 214 toward image sensor 208. Reflector 214 may be a mirror, a prism, a beam splitter, or others.

The total distance of light path from imaging lens 206 to image sensor 208, which is folded 90° by reflector 214, is D, which may be the same as D in FIG. 1. The width of imaging system 204 including imaging lens 206, reflector 214, and image sensor 208 is D1. In an embodiment, D1 is less than the thickness T of mobile phone 202. The length of imaging system 204 including imaging lens 206, reflector 214, and image sensor 208 is D2. In an embodiment, D2 is less than the width W of mobile phone 202. The width W of mobile phone 202 is less than the length of mobile phone 202 (not shown). Accordingly, imaging system 204 can be installed in mobile phone 202.

Figure 3:
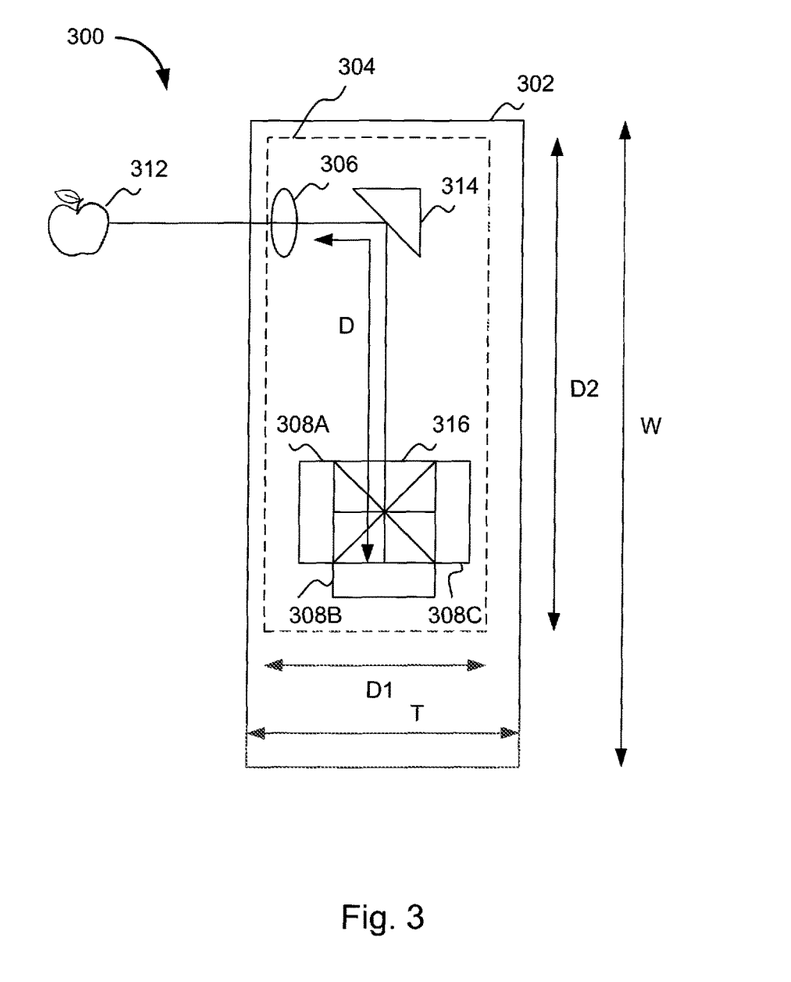
FIG. 3 illustrates an exemplary embodiment comprising an optical imaging system installed in a mobile phone.

FIG. 3 illustrates an exemplary embodiment 300 comprising an optical imaging system 304 installed in a mobile phone 302. Imaging system 304 comprises an imaging lens 306 and a reflector 314. Imaging system 304 further comprises an X-cube 316, and three monochrome image sensors 308A, 308B, and 308C. X-cube is a cross dichroic beam splitter. For example, X-cube 316 splits the incident light into red light and directs the red light toward image sensor 308A, splits the incident light into green light and directs the green light toward image sensor 308B, and splits the incident light into blue light and directs the blue light toward image sensor 308C. In an embodiment, images sensors 308A-308C are mounted on three sides of X-cube 316.

Imaging lens 306 forms a red image of an object 312 on image sensor 308A, a green image of object 312 on image sensor 308B, and a blue image of object 312 on image sensor 308C.

The total distance of light path from imaging lens 306 to image sensor 308B, which is folded 90° by reflector 314, is D, which may be the same as D in FIG. 1. The total distance of light paths from imaging lens 306 to image sensors 308A and 308C are the same as the total distance of light path from imaging lens 306 to image sensor 308B. The width of imaging system 304 including imaging lens 306, reflector 314, X-cube 316, and image sensors 308A-308C is D1. In an embodiment, D1 is less than the thickness T of mobile phone 302. The length of imaging system 304 including imaging lens 306, reflector 314, X-cube 316, and image sensors 308A-308C is D2. In an embodiment, D2 is less than the width W of mobile phone 302. The width W of mobile phone 302 is less than the length of mobile phone 302 (not shown). Accordingly, imaging system 304 can be installed in mobile phone 302.

Figure 4:
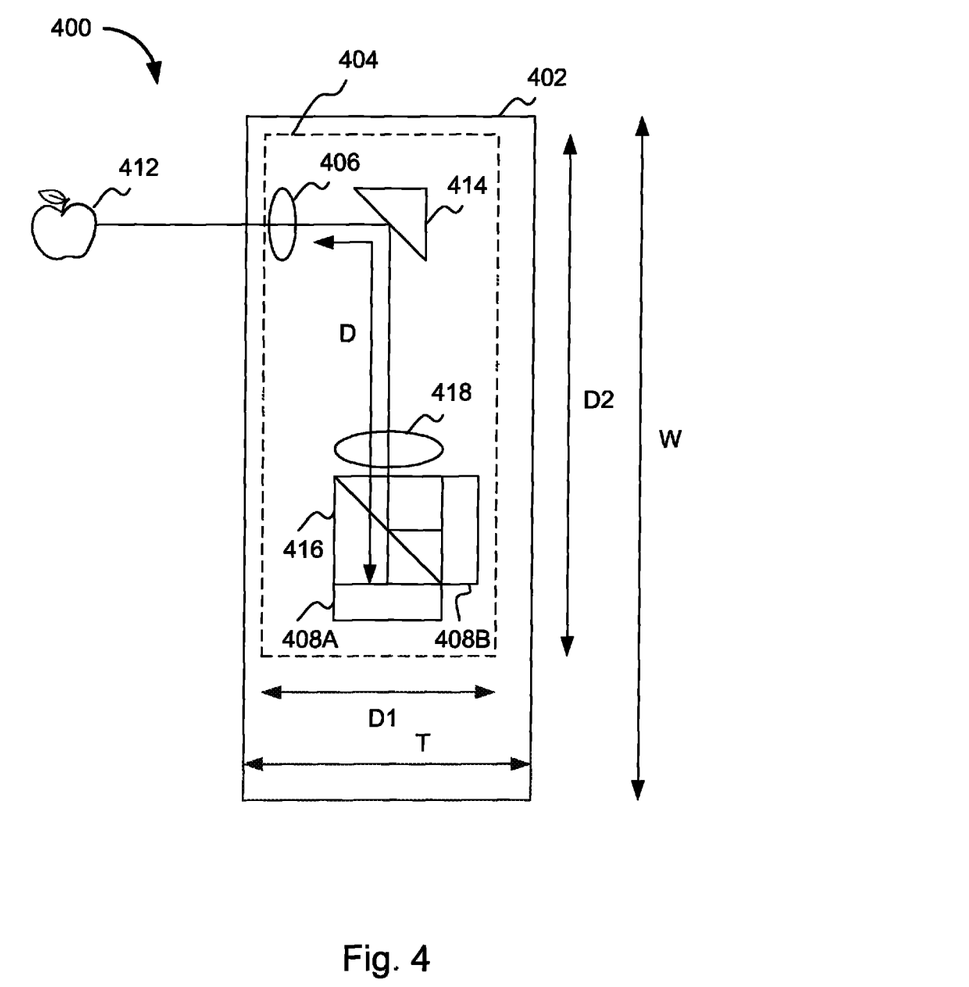
FIG. 4 illustrates an exemplary embodiment comprising an optical imaging system installed in a mobile phone, according to the present invention.

FIG. 4 illustrates an exemplary embodiment 400 comprising an optical imaging system having dual image sensors 404 installed in a mobile phone 402, according to the present invention. Imaging system 404 comprises a first imaging lens 406 and a reflector 414 for folding the light path 90°. Imaging system 404 further comprises a dichroic beam splitter 416, and two image sensors 408A and 408B. Image sensor 408A may be a green monochrome image sensor. Image sensor 408B may be a color image sensor having color filter array. For example, dichroic beam splitter 416 transmits the green component of the incident light toward image sensor 408A, and reflects the rest of the incident light toward image sensor 408B. In an embodiment, images sensors 408A-408B are mounted on two sides of dichroic beam splitter 416. The image captured by image sensor 408A and the image captured by image sensor 408B are combined to form a single color image. Image sensor 408A and image sensor 408B preferably have the same number and the same size of pixels. Thus, the images captured by image sensors 408A and 408B can be combined without changing their pixel size and/or number.

Since two image sensors are used, the imaging system has more pixels (e.g., doubled) in an effective imaging area as compared with a single image sensor. Thus better performance may be provided.

In an embodiment, imaging system 404 may include a second imaging lens 418. Second imaging lens 418 may be disposed on dichroic beam splitter 416 opposite the first image sensor 408A. First imaging lens 406 together with second imaging lens 418 forms a green image of an object 412 on image sensor 408A, and an image without green light component of object 412 on image sensor 408B.

The total distance of light path from imaging lens 406 to image sensor 408A, which is folded 90° by reflector 414, is D, which may be the same as D in FIG. 1. The total distance of light paths from imaging lens 406 to image sensor 408B is the same as the total distance of light path from imaging lens 406 to image sensor 408A. The width of imaging system 404 including first imaging lens 406, reflector 414, second imaging lens 418, dichroic beam splitter 416, and image sensors 408A and 408B is D1. In an embodiment, D1 is less than the thickness T of mobile phone 402. The length of imaging system 404 including first imaging lens 406, reflector 414, second imaging lens 418, dichroic beam splitter 416, and image sensors 408A and 408B is D2. In an embodiment, D2 is less than the width W of mobile phone 402. The width W of mobile phone 402 is less than the length of mobile phone 402 (not shown). Accordingly, imaging system 404 can be installed in mobile phone 402.

In an embodiment, image sensors 408A and 408B may include a cover glass. In an embodiment, image sensors 408A and 408B may not include a cover glass, and they are directly mounted on the surfaces of dichroic beam splitter 416 using adhesive or other means.

In an embodiment, imaging system 404 may not include second imaging lens 418 that is disposed on dichroic beam splitter 416. In an embodiment, dichroic beam splitter 416 may transmit light having a color (e.g., red), which is not green, and reflects the light lacking the color (e.g., red), which is not green.

Figure 5A:
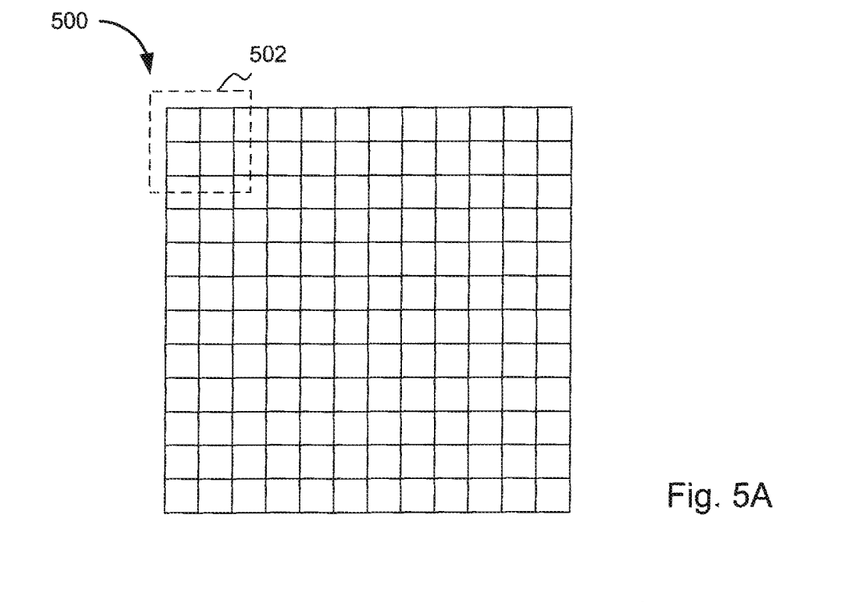
FIG. 5A illustrates a part of an exemplary color filter array, according to the present invention.
Figure 5B:
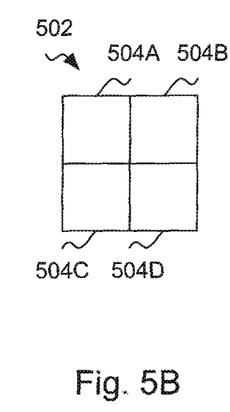
FIG. 5B illustrates a 2×2 color filter pattern including four color filters, according to the present invention.

For example, a green image is formed on monochrome image sensor 408A. Monochrome image sensor 408A preferably has no color filter array disposed on its pixels. Monochrome image sensor 408A having color filter array is also possible. An image of light lacking green color is formed on color image sensor 408B. Color image sensor 408B has a color filter array disposed on its pixels. FIG. 5A illustrates a part of an exemplary color filter array 500 disposed on pixels of color image sensor 408B, according to the present invention. Color filter array 500 comprises repeated color filter patterns 502. For example, FIG. 5B illustrates a 2×2 color filter pattern 502 including color filters 504A, 504B, 504C, and 504D, according to the present invention.

Figure 5C:
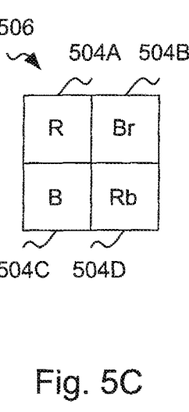
FIG. 5C illustrates, a 2×2 color filter pattern comprises a red (R) filter, a blue-red (Br) filter, a blue (B) filter, and a red-blue (Rb) filter, according to the present invention.
Figure 5D:
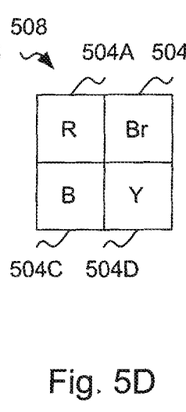
FIG. 5D illustrates, a 2×2 color filter pattern comprises a red (R) filter, a blue-red (Br) filter, a blue (B) filter, and a yellow (Y) filter, according to the present invention.
Figure 5E:
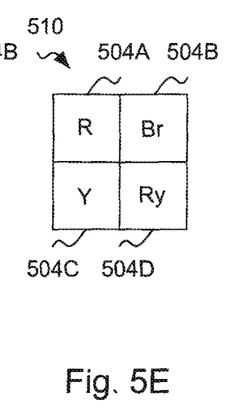
FIG. 5E illustrates, a 2×2 color filter pattern comprises a red (R) filter, a blue-red (Br) filter, a yellow (Y) filter, and a red-yellow (Ry) filter, according to the present invention.

FIG. 5C illustrates, a 2×2 color filter pattern 506 comprises a red (R) filter 504A, a blue-red (Br) filter 504B, a blue (B) filter 504C, and a red-blue (Rb) filter 504D, according to the present invention. A blue-red (Br) filter (e.g., 380-475 nm) may be replaced with a blue (B) filter (e.g., 475 nm), and a red-blue (Rb) filter (e.g., 625-690 nm) may be replaced with a red (R) filter (e.g., 650 nm). FIG. 5D illustrates, a 2×2 color filter pattern 508 comprises a red (R) filter 504A, a blue-red (Br) filter 504B, a blue (B) filter 504C, and a yellow (Y) filter 504D (e.g., 570 nm), according to the present invention. A blue-red (Br) filter may be replaced with a blue (B) filter. FIG. 5E illustrates, a 2×2 color filter pattern 510 comprises a red (R) filter 504A, a blue-red (Br) filter 504B, a yellow (Y) filter 504C, and a red-yellow (Ry) filter 504D, according to the present invention. A blue-red (Br) filter may be replaced with a blue (B) filter, and a red-yellow (Ry) filter (e.g., 625-690 nm) may be replaced with a red (R) filter. In addition to color filter combinations illustrated in FIGS. 5C-5E, other color filter combinations are possible. The wavelength ranges of color filters are for examples. Other numbers (wavelengths) may be used.

Figure 6:
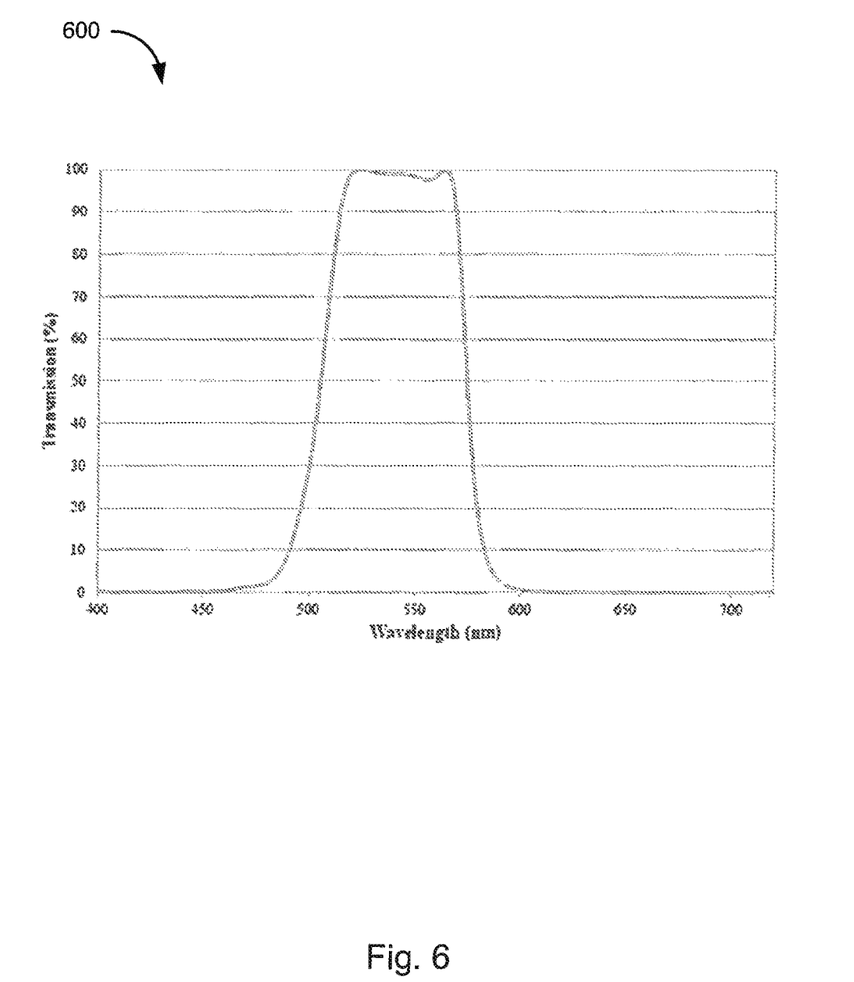
FIG. 6 illustrates an exemplary filter response of a dichroic filter, according to the present invention.

Dichroic beam splitter 416 may be any beam splitter comprising two prisms and having a dichroic filter between two prisms. The dichroic filter may be a multi-layer interference filter. For example, the dichroic filter has a filter response 600 as illustrated in FIG. 6, according to the present invention. For example, filter response 600 shows that green light having wavelengths in a band of 505 nm-575 nm is transmitted through dichroic beam splitter 416. The rest of light having wavelength outside the band of 505 nm-575 nm is reflected by dichroic beam splitter 416. In other words, the dichroic filter transmits light of a color band and reflects light of all colors outside the color band. It is also possible that the dichroic filter reflects light of a color band and transmits light of all colors outside the color band.

In an embodiment, the dichroic beam splitter 416 may be a wafer level dichroic beam splitter singulated from a dichroic beam splitter wafer. For example, a polarizing beam splitter wafer and its method of manufacturing are disclosed in U.S. patent application Ser. No. 14/605,554 filed Jan. 26, 2015, which is assigned to the assignee of the current application. Accordingly, U.S. patent application Ser. No. 14/605,554 is incorporated by reference herein. A polarizing beam splitter transmits light having a first polarization and reflects light having a second polarization, where the first polarization and the second polarization are orthogonal. On the other hand, a dichroic beam splitter transmits light of a color band and reflects light of all colors outside the color band.

Figure 7A:
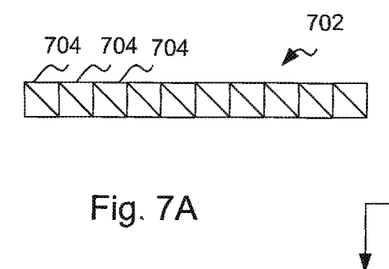
FIG. 7A illustrates a cross-section of an exemplary dichroic beam splitter wafer, according to the present invention.
Figure 7B:
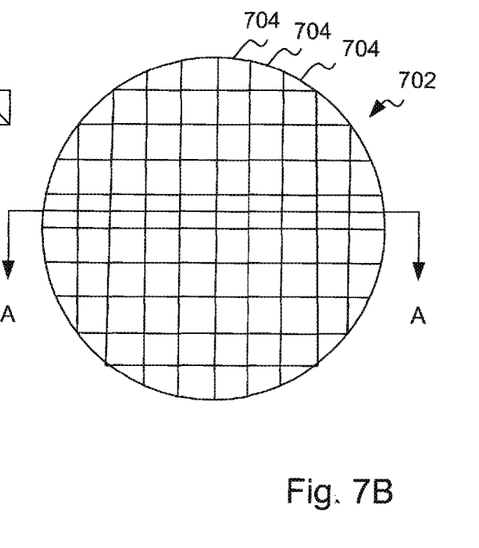
FIG. 7B illustrates a top view of exemplary dichroic beam splitter wafer, according to the present invention.
Figure 7C:
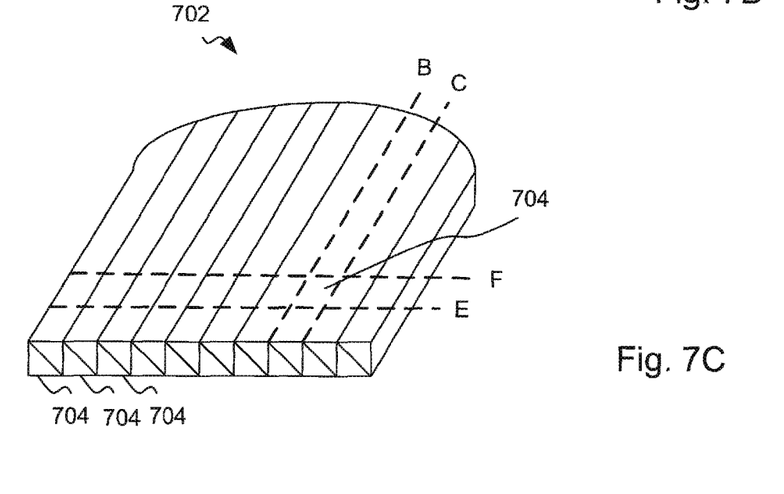
FIG. 7C illustrates a perspective view of exemplary dichroic beam splitter wafer, according to the present invention.

FIG. 7A illustrates a cross-section of an exemplary dichroic beam splitter wafer 702, according to the present invention. FIG. 7B illustrates a top view of exemplary dichroic beam splitter wafer 702, according to the present invention. FIG. 7C illustrates a perspective view of exemplary dichroic beam splitter wafer 702, according to the present invention. FIG. 7A is a cross-section along line AA in FIG. 7B. Dichroic beam splitter wafer 702 comprises a plurality of wafer level dichroic beam splitters 704. For example, a bar comprising wafer level dichroic beam splitters can be obtained after dicing dichroic beam splitter wafer 702 along line B and line C. Furthermore, an individual wafer level dichroic beam splitter 704 is obtained after dicing the bar comprising wafer level dichroic beam splitters along line E and line F. It is appreciated that FIGS. 7A-7C are schematic representations. Dichroic beam splitter wafer 702 has more dichroic beam splitters 704 than what are shown in FIGS. 7A-7C. For example, to singulate wafer level dichroic beam splitters (e.g., dichroic beam splitters 704), dichroic beam splitter wafer 702 is diced repeatedly in orthogonal directions (e.g., lines B and C direction and lines E and F direction).

Figure 8A:
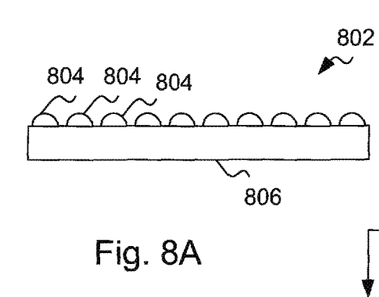
FIG. 8A illustrates a cross-section of an exemplary lens wafer, according to the present invention.
Figure 8B:
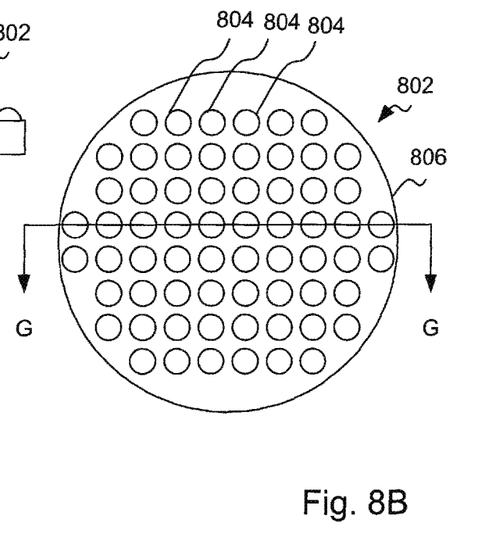
FIG. 8B illustrates a top view of exemplary lens wafer, according to the present invention.
Figure 8C:
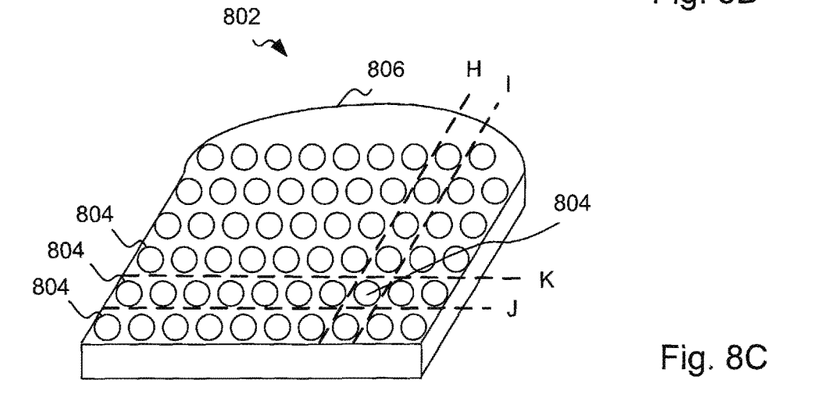
FIG. 8C illustrates a perspective view of exemplary lens wafer, according to the present invention.

Similarly, second imaging lens 418 may be a wafer level lens. FIG. 8A illustrates a cross-section of an exemplary lens wafer 802, according to the present invention. FIG. 8B illustrates a top view of exemplary lens wafer 802, according to the present invention. FIG. 8C illustrates a perspective view of exemplary lens wafer 802, according to the present invention. FIG. 8A is a cross-section along line GG in FIG. 8B. Lens wafer 802 comprises a plurality of wafer level lens 804. It is appreciated that FIGS. 8A-8C are schematic representations. Lens wafer 802 has more wafer level lenses 804 than what are shown in FIGS. 8A-8C. For example, to singulate wafer level lenses 804, lens wafer 802 is diced repeatedly in orthogonal directions (e.g., lines H and I direction and lines J and K direction).

Figure 9:
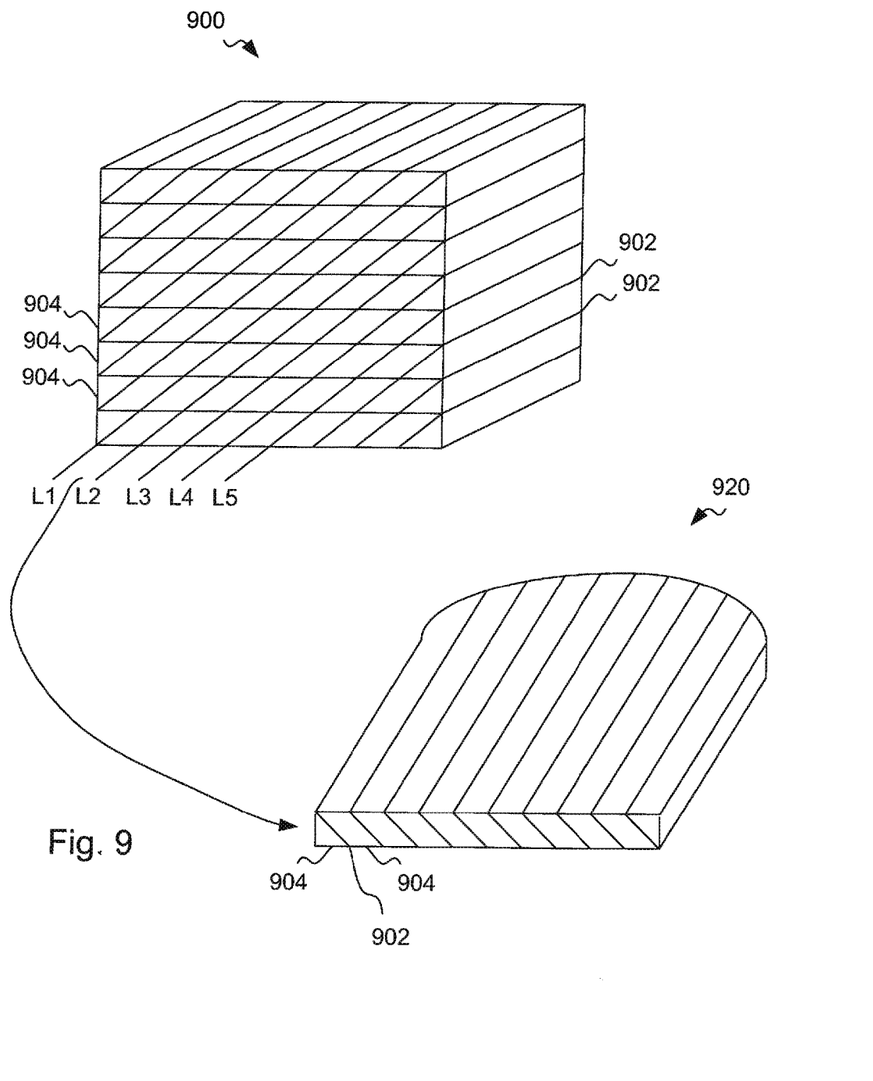
FIG. 9 illustrates a method for making dichroic beam splitter wafers.

FIG. 9 illustrates a method for making dichroic beam splitter wafers, according to the present invention. A planar dichroic filter layer 902 is disposed on a planar substrate 904. Planar dichroic filter layer 902 may be a multi-layer interference filter. Another planar substrate 904 is disposed on planar dichroic filter layer 902, and another planar dichroic filter layer 902 is disposed on planar substrate 904. The process is repeated to form a block 900 comprising a plurality of planar substrates 904 and a plurality of dichroic filter layer 902, which are on top of each other.

Block 900 is diced diagonally along lines L1, L2, L3, L4, . . . , to produce slices of dichroic beam splitter wafers 920. A dichroic beam splitter wafer 920 comprises substrate layers 904 and dichroic filter layers 902 between two substrate layers 904, each dichroic filter layer 902 is disposed diagonally between two substrate layers 904. For example, dichroic beam splitter wafer 920 may be dichroic beam splitter wafer 702 of FIG. 7C.

Figure 10:
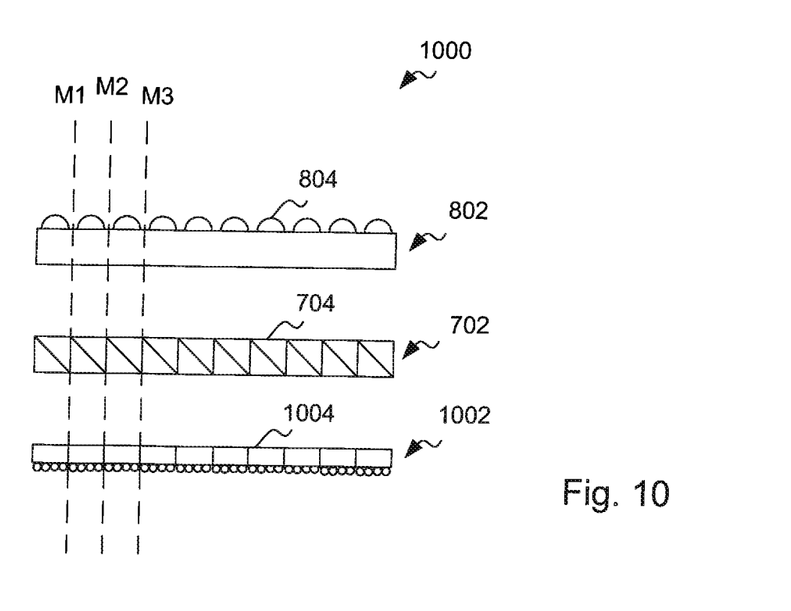
FIG. 10 illustrates an embodiment comprising dichroic beam splitter wafer disposed on an image sensor wafer, and a lens wafer disposed on the dichroic beam splitter wafer, according to the present invention.

FIG. 10 illustrates an embodiment 1000 comprising dichroic beam splitter wafer 702 of FIG. 7 disposed on an image sensor wafer 1002, according to the present invention. Image sensor wafer 1002 comprises a plurality of first image sensors 1004. In an embodiment, first image sensor 1004 is a monochrome image sensor. Optionally, lens wafer 802 of FIG. 8 is disposed on dichroic beam splitter wafer 702. Each of wafer level lenses 804 is aligned with each of first image sensors 1004 of image sensor wafer 1002 and each of wafer level dichroic beam splitter 704.

Figure 11:
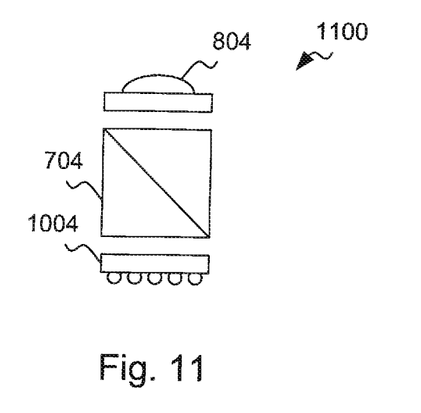
FIG. 11 illustrates a unit singulated from the embodiment of FIG. 10, according to the present invention.

FIG. 11 illustrates a unit 1100 singulated from embodiment 1000 of FIG. 10. For example, embodiment 1000 is diced along lines M1, M2, M3, . . . , to form units 1100. A singulated unit 1100 comprises a wafer level dichroic beam splitter 704 disposed on a first image sensor 1004, and a wafer level lens 804 disposed on wafer level dichroic beam splitter 704, according to the present invention. Wafer level lens 804 is optional. In other words, first image sensor 1004 is mounted on wafer level dichroic beam splitter 704.

Figure 12:
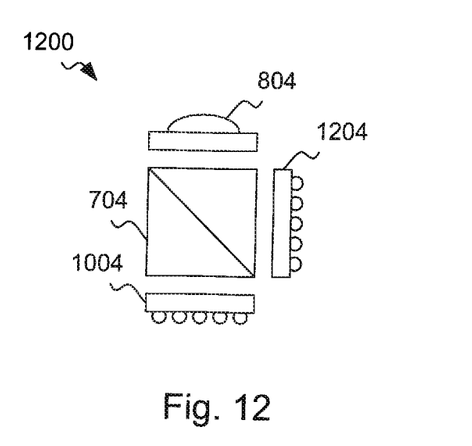
FIG. 12 illustrates a second image sensor mounted on a side of wafer level dichroic beam splitter of the singulated unit of FIG. 11, according to the present invention.

FIG. 12 illustrates a singulated unit 1200, which is an embodiment of an imaging system having dual image sensors. A second image sensor 1204 is mounted on a side of wafer level dichroic beam splitter 704 of embodiment 1100 of FIG. 11, according to the present invention. An incident light is transmitted through wafer level lens 804 and incident on wafer level dichroic beam splitter 704. The light of a color band (e.g., green light) transmits through dichroic beam splitter 704 toward a light transmitting side and is incident on first image sensor 1004. The rest of light is reflected by dichroic beam splitter 704 toward a light reflecting side and is incident on second image sensor 1204. First image sensor 1004 may be first image sensor 408A of FIG. 4, and second image sensor 1204 may be second image sensor 408B of FIG. 4.

In an embodiment, first image sensor 1004 is a monochrome image sensor preferably having no color filter array disposed on its pixels. Second image sensor 1204 is a color image sensor having a color filter array disposed on its pixels. First image sensor 1004 and second image sensor 1204 capture the images formed by the transmitted light in a color band (e.g., green color) and the reflected light outside the color band, respectively. The image captured by first image sensor 1004 and the image captured by second image sensor 1204 are combined to form a single color image. Singulated unit 1200, which is an embodiment of an imaging system having dual image sensors, may be installed in a mobile phone.

It is appreciated that a wafer level dichroic beam splitter may be replaced by a regular dichroic beam splitter, which is not singulated from a dichroic beam splitter wafer. It is also appreciated that a wafer level lens may be replaced by other lenses not singulated from a lens wafer such as a molded lens.

Referring to FIGS. 5A-5E, color filter arrays can include red, blue, red-blue, blue-red, yellow, red-yellow filters, etc. Accordingly, a richer color image covering larger CIE (Commission Internationale de l'Eclairage/International Commission on Illumination) color map may be provided. Furthermore, since no green color filter is disposed on the pixels of first image sensor 1004 (image sensor 408A), the green sensitivity of the image sensor is higher than that of the traditional image sensor having green color filter disposed on the pixels. Also, no interpolation or demosaicking for green image component is required.

Referring to FIG. 3, an X-cube is made by combining four triangular prisms, thus it cannot be manufactured as a dichroic beam splitter wafer as shown in FIG. 9. An X-cube cannot be used in singulated unit 1200 of FIG. 12, which is processed in wafer level before singulation. An X-cube may be more costly even as compared with a regular dichroic beam splitter, which is not a wafer level dichroic beam splitter.

While the present invention has been described herein with respect to the exemplary embodiments and the best mode for practicing the invention, it will be apparent to one of ordinary skill in the art that many modifications, improvements and sub-combinations of the various embodiments, adaptations and variations can be made to the invention without departing from the spirit and scope thereof.

The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An imaging system for capturing an image of an object comprising:
    a first lens;
    a dichroic beam splitter having a dichoric filter disposed between two prisms, wherein the dichroic filter transmits light of a color band and reflects light of all colors outside the color band;
    a first image sensor for capturing an image formed by the transmitted light in the color band;
    a second image sensor for capturing an image formed by the reflected light outside the color band;
    wherein the first image sensor is a monochrome image sensor and the second image sensor is a color image sensor having a color filter array disposed on pixels of the second image sensor;
    wherein the image captured by the first image sensor and the image captured by the second image sensor are combined to form a single color image;
    wherein the dichroic beam splitter is a wafer level dichroic beam splitter singulated from a dichroic beam splitter wafer, and wherein the dichroic beam splitter wafer is produced by dicing diagonally a block comprising a plurality of planar substrate layers and a plurality of planar dichroic filter layers, each dichroic filter layer is disposed between two substrate layers.

2. The imaging system of claim 1, wherein the first image sensor is a monochrome image sensor having no color filter array disposed on pixels of the first image sensor.

3. The imaging system of claim 1, wherein the color band is green color band and the first image sensor is a green monochrome image sensor.

4. The imaging system of claim 1, wherein the color filter array comprises red color filter.

5. The imaging system of claim 4, wherein the color filter array further comprises one of blue and yellow color filters.

6. The imaging system of claim 4, wherein the color filter array further comprises one of blue-red, red-blue, and red-yellow color filters.

7. The imaging system of claim 1, wherein the first image sensor and the second image sensor are mounted on two sides of the dichroic beam splitter.

8. The imaging system of claim 1 further comprising a second lens disposed on the dichroic beam splitter opposite the first image sensor.

9. The imaging system of claim 1, wherein the imaging system is installed in a mobile phone.

10. An electronic device comprising an imaging system for capturing an image of an object, the imaging system comprising:
    a first lens;
    a reflector for folding an optical path 90°;
    a dichroic beam splitter having a dichoric filter disposed between two prisms, wherein the dichroic filter transmits light of a color band and reflects light of all colors outside the color band;
    a first image sensor for capturing an image formed by the transmitted light in the color band;
    a second image sensor for capturing an image formed by the reflected light outside the color band;
    wherein the first image sensor is a monochrome image sensor and the second image sensor is a color image sensor having a color filter array disposed on pixels of the second image sensor;
    wherein the image captured by the first image sensor and the image captured by the second image sensor are combined to form a single color image;
    wherein the dichroic beam splitter is a wafer level dichroic beam splitter singulated from a dichroic beam splitter wafer, and wherein the dichroic beam splitter wafer is produced by dicing diagonally a block comprising a plurality of planar substrate layers and a plurality of planar dichroic filter layers, each dichroic filter layer is disposed between two substrate layers.

11. The electronic device of claim 10, wherein the first image sensor and the second image sensor are mounted on two sides of the dichroic beam splitter.

12. The electronic device of claim 10 further comprising a second lens disposed on the dichroic beam splitter opposite of the first image sensor.

13. The electronic device of claim 10, wherein the electronic device comprises a mobile phone.

* * * * *